United States Patent [19]

Abe

[11] Patent Number: 5,072,332

[45] Date of Patent: Dec. 10, 1991

[54] HEAT-DISSIPATING STRUCTURE FOR A SWITCHING POWER SUPPLY

[75] Inventor: Shigeo Abe, Tsurugashima, Japan

[73] Assignee: Toko Kabushiki Kaisha, Tokyo, Japan

[21] Appl. No.: 542,947

[22] Filed: Jun. 25, 1990

[30] Foreign Application Priority Data

Jun. 27, 1989 [JP] Japan .................................. 1-164192

[51] Int. Cl.⁵ .............................................. H05K 7/20
[52] U.S. Cl. ..................................... 361/386; 361/388; 363/141
[58] Field of Search ............... 174/16.3; 361/386–389; 363/141, 144

[56] References Cited

U.S. PATENT DOCUMENTS 4,670,833 6/1987 Sachs .................................... 361/386
4,754,390 6/1988 Felton et al. ......................... 363/141
4,812,733 3/1989 Tobey .................................. 361/388

Primary Examiner—Gregory D. Thompson
Attorney, Agent, or Firm—Stevens, Davis, Miller & Mosher

[57] ABSTRACT

A heat-dissipating structure for a switching power supply characterized in that the respective portions of the power supply lines on the hot side and the cold side connected respectively to the output terminals after a switching element are formed by plate conductors, and connected to said power supply lines, and that the heat generating circuit elements placed at the top, thereunder the plate conductor on one side, a heat conductive insulator, the plate conductor on the other side, and another heat conductive insulator are sequentially overlaid and fixed on a box member.

2 Claims, 2 Drawing Sheets

HEAT-DISSIPATING STRUCTURE FOR A SWITCHING POWER SUPPLY

BACKGROUND OF THE INVENTION

The present invention relates to a heat-dissipating, structure for a switching power supply.

As switching frequency become higher, the structures of the power transformer, choke coil, and smoothing capacitor, which take up a considerable volume, can be made smaller, making it possible to miniaturize the switching power supply.

However, as frequencies becomes higher, the circuits and the circuit elements of a printed circuit board produce more heat.

In a power source where the input and output sides are insulated by a power transformer driven by a switching element, such as a monolithic or inverter system, a measure is taken to reduce the heat generation on the input side mostly by improving the oscillating circuit, but there is almost no improvement for the circuits on the output side.

As a result, the circuit on the output side produces considerable heat, and a for dissipating heat is still required. Thus although the sizes of the components and circuit elements are being reduced, the miniaturization of the power source supply as a whole has not made progress as anticipated.

SUMMARY OF THE INVENTION

The subject of the present invention is to achieve the miniaturization of the switching power supply as a whole, and particularly to make it thinner by providing efficient heat-dissipation for the circuit on the output side beyond the switching element.

A switching power supply according to the present invention is characterized in that the respective portions of the power supply lines on the hot and cold sides connected to the output terminals after the switching element are formed by plate conductors, and connected to said power supply lines, and that the heat generating circuit elements placed at the top, thereunder the plate conductor on one side, a heat conductive insulator, the plate conductor on the other side, and another conductive insulator are sequentially overlaid and fixed on a box member.

DETAILED DESCRIPTION OF THE PREFERRED EMBODIMENT

Figure 1:
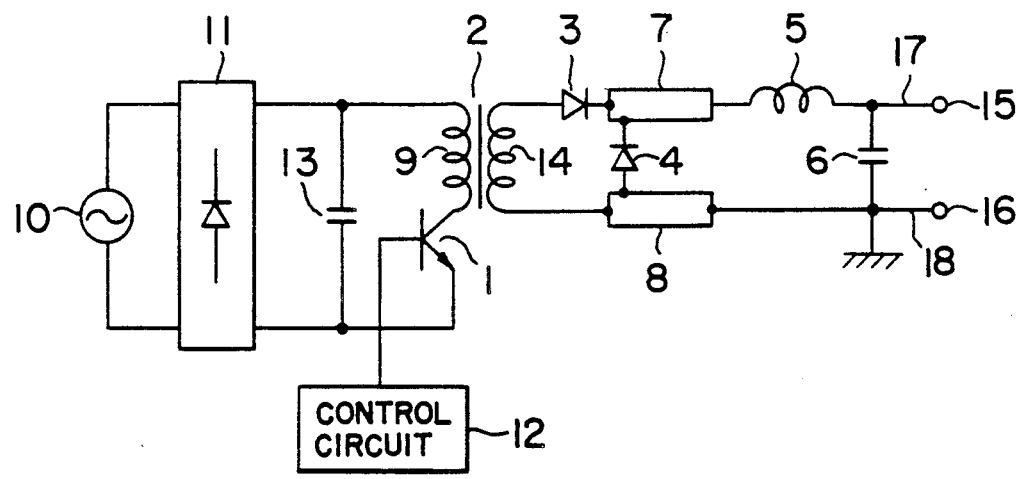
FIG. 1 is a schematic diagram representing an embodiment of a switching power supply according to the present invention.
Figure 2:
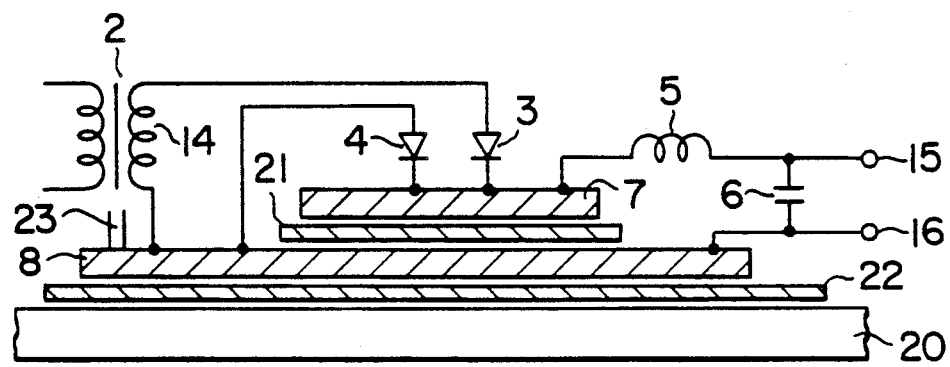
FIG. 2 is a view illustrating the cross-section of the heat-dissipating structure.

An embodiment of a switching power supply according to the present invention will subsequently be described with reference to FIG. 1 and FIG. 2. FIG. 1 is a diagram representing the circuit configuration, and FIG. 2 is a cross-sectional view illustrating a heat-dissipating structure.

In FIG. 1 representing a switching power supply which has a main switching transistor for control, 1 is a switching element, 2 is a power transformer driven by the switching element 1, 3 is a rectifying diode, 4 is a flywheel diode, 5 is a choke coil, 6 is a smoothing capacitor, and 7 and 8 are plate conductors respectively. The plate conductors 7 and 8 are effectively formed by a copper plate of approximately 1 mm having an excellent heat-dissipating quality.

The switching element 1 is serially connected to the primary winding 9 on the input side of the transformer 2 so as to control intermittent flow of a direct current obtained from a commercial power source 10 through the rectifying circuit 11. 12 is a control circuit for the switching element 1, and 13 is an input capacitor.

One side of the secondary winding 14 on the output side of the transformer 2 is connected to an output terminal 15 on the hot side through the diode 3, plate conductor 7 and choke coil 5 while the other side is connected to an output terminal 16 on the cold side through the plate conductor 8.

The plate conductor 7 and plate conductor 8 are respectively connected to the power supply lines 17 and 18 on the hot and cold sides to form the respective portions. Although the diode 4 and capacitor 6 are connected across the power supply lines 17 and 18, the diode 4 is connected across the plate conductor 7 and plate conductor 8. Also, one end of the diode 3 is connected to the plate conductor 7.

The circuit of a switching power supply, such as described above, is formed by connecting circuit elements with conductor patterns provided on a printed-circuit board. However, by constructing the portions of the power supply lines 17 and 18 with the plate conductor 7 and plate conductor 8, each having a wide cross-sectional area, it is possible to reduce the heat-generation as well as to improve the heat-dissipation of the power supply lines.

Also, by stacking the diode 3, diode 4, and plate conductors 7 and 8, the heat generated by the circuit elements can be dissipated effectively.

In other words, the heat-generating circuit elements, diode 3, diode 4, plate conductor 7 and plate conductor 8, are overlaid as shown in FIG. 2 and fixed onto a casing 20.

The diode 3 and diode 4 are fixed on the surface of the plate conductor 7 to which their cathodes are connected.

Under the plate conductor 7, the plate conductor 8 is located with a heat conductive insulating plate 21 arranged therebetween. Furthermore, with the other heat conductive insulating plate 22, they are overlaid and fixed onto box member 20. The heat conductive insulatin plants 22, for example, are effectively made of plastic sheets of silicone having an excellent heat conductivity. The heat conductive insulating plate 21 insulates the plate conductor 7 from the plate conductor 8 while the heat conductive insulating plate 22 insulates the plate conductor 8 from the box member 20.

In this way, by constructing the portions of the power supply lines 17 and 18 on the output sides with the plate conductors 7 and 8, each having an excellent heat-dissipation dissipation characteristic as well as by fixing onto the box member 20 the overlaid plate conductors 7 and 8 with the heat-generating diodes 3 and 4 fixed on the plate conductor 7 which is placed on the top thereof, the heat generated by the diodes 3 and 4, and the power supply lines 17 and 18, is dissipated to the box member 20 effectively. Furthermore, a core 23 which is a portion of the power transformer 2 can be fixed on the surface of the plate conductor 8 so as to dissipate its heat. In this respect, if a power supply which is a type of a flyback system is employed, the diode 4 is not required.

Since the thickness of the overlaid plate conductors and heat conductive insulating plates does not remarkably differ from that of the printed-circuit board where the other parts of the circuits are formed, the height from the box member 20 can be arranged almost the same as that of the printed-circuit board. Hence, it is possible to fix both of them on the box member 20 next to each other.

Figure 3:
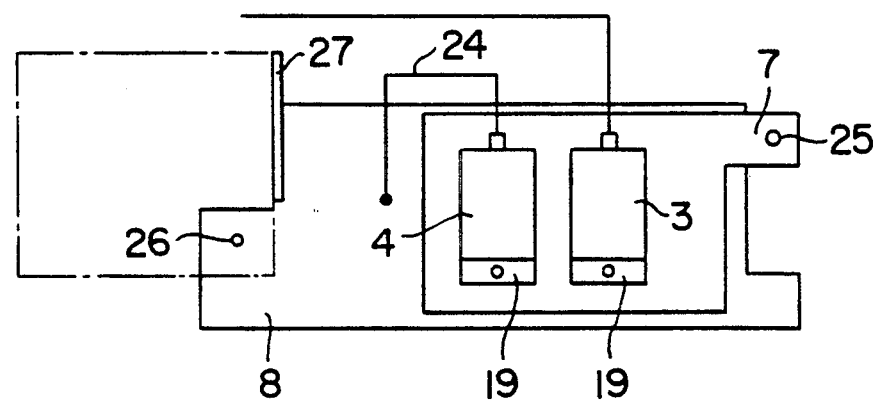
FIG. 3 is a plan view representing an example of the arrangement of the heat-dissipating structure.

FIG. 3 is a plan view representing an example of the arrangement of the diode 3, diode 4, plate conductor 7, and plate conductor 8.

The cathode faces 19 of the diodes 3 and 4, which function as heat-dissipating plates, are fixed to make contact with the surface of the plate conductor 7, and the lead line 24 connected with the anode of the diode 4 is connected to the plate conductor 8. To a hole 25 of the plate conductor 7, the one side of the terminal of the choke coil 5 is inserted so as to be fixed therein while a hole 26 of the plate conductor 8 is the one to which the terminal on the cold side of the secondary winding 14 of the power transformer 2 is inserted and fixed. The dashed line represents the location where the power transformer 2 is arranged. The heat dissipation of the core of the power transformer 2 is possible by contacting the side of the core with the vertically bent portion 27 of the plate conductor 8. The power transformer 2 and choke coil 5 are arranged across the printed-circuit board and the plate conductor 8 and plate conductor 7. In this respect, the heat conductive insulating plates 21 and 22 are not shown in FIG. 3.

Figure 4:
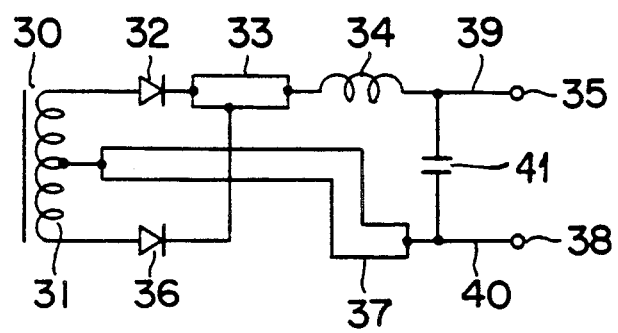
FIG. 4 is a partial diagram representing another embodiment of a switching power supply according to the present invention.

FIG. 4 is a partial diagram representing another embodiment of a switching power supply according to the present invention.

In FIG. 4, a diagram is shown to illustrate only the circuit of the switching power supply on the output side using an inverter system which carries out rectification on the output side after a direct current is converted into a high-frequency alternating current on the input side.

The one side of the secondary winding 31 of the power transformer 30 is connected to the output terminal 35 on the hot side through the rectifying diode 32, plate conductor 33, and choke coil 34 while the other side is connected to the plate conductor 33 through the rectifying diode 36.

The tap placed in the center of the secondary winding 31 is connected to the output terminal 38 on the cold side through the plate conductor 37.

A portion of the power supply line 39 on the hot side from the one side of the secondary winding 31 to the output terminal 35, and a portion of the power supply line 40 on the cold side from the tap of the secondary winding 31 to the output terminal 38 are formed respectively by the plate conductor 33 and the plate conductor 37. 41 is a smoothing capacitor.

In a switching power supply, such as this, the diode 32 and the diode 36 are fixed on the plate conductor 33, by overlaying and fixing the plate conductor 37 thereunder and another conductive insulating plate sequentially onto a box member, interposing a conductive insulating plate underneath the plate conductor 33. Thus, an excellent heat-dissipating structure can be obtained for the diodes 32 and 36 as well as for the power supply lines 39 and 40.

Figure 5:
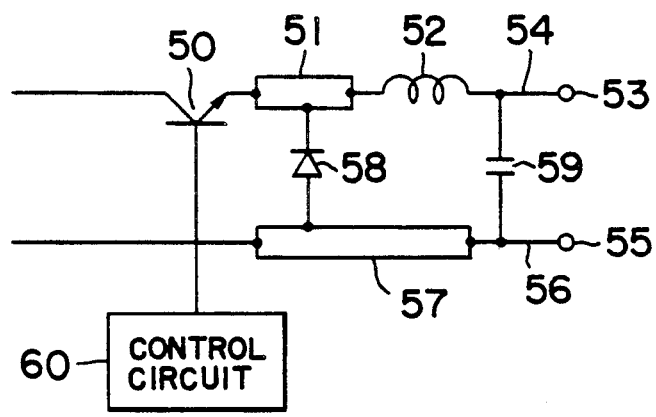
FIG. 5 is a partial diagram representing still another embodiment of a switching power supply.

FIG. 5 is a schematic diagram representing still another embodiment of a switching power supply according to the present invention. In FIG. 5, there is shown a circuit on the output side beyond the switching element of a switching power supply using a chopper system.

The switching element 50 is connected to the output terminal 53 through the plate conductor 51 and the choke coil 52, and a portion of the power supply line 54 on the hot side is formed by the plate conductor 51. A portion of the power supply line 56 on the cold side connected to the output terminal 55 is also formed by the plate conductor 57. A flywheel diode 58 is connected across the plate conductor 51 and plate conductor 57. 59 is a smoothing capacitor, and 60 is a control circuit for the switching element 50.

The diode 58 is fixed on the plate conductor 51, and by overlaying and fixing the plate conductor 57 thereunder and another conductive insulating plate sequentially onto a box member, interposing a conductive insulating plate underneath the plate conductor 51. Thus, an excellent structure can be obtained for dissipating the heat generated by the diode 58 and the power supply lines 54 and 56.

In this respect, according to the embodiments, all the plate conductors on the hot side are placed on the upper side when they are overlaid. This set up is made in consideration of the simplicity with which the circuit elements are mounted not only because the cathode of the diode which generates heat is connected to the plate conductor on the hot side, but also because by fixing the cathode, which also functions as a heat-dissipating plate, on said plate conductor with its pole underside, the required electrical connection can be performed at the same time. However, the positions of the hot side and cold side can be reversed.

Also, as a heat generating element, some other circuit elements than the diode, such as a smoothing capacitor, can be fixed on the plate conductor.

In this respect, although the plate conductor can be arranged at any place on the power supply line on the output side, it should be convenient if the plate conductor is located at a place where at least one end of a heat generating element such as a diode can be connected thereto when the plate conductors are overlaid and fixed onto a box member.

As set forth above, a switching power supply according to the present invention can effectively dissipate the heat generated by the power supply lines and circuit elements by constructing portions of the power supply lines on the output side beyond the switching element with plate conductors as well as by overlaying the plate conductors on which the heat generating circuit elements are fixed. Furthermore, if the core of the power transformer is arranged to make contact with the plate conductor, the heat-dissipation of the core can be performed. These effects can be produced by replacing the respective portions of the conductive pattern of the power supply lines with the plate conductors without any other heat-dissipating components. Hence, the structure is simply made. The thickness of the overlaid plate conductors is approximately as thin as the printed-circuit board. Thus, there is no need of making the entire structure thicker in order to perform the heat-dissipation.

As a result, the present invention contributes significantly to miniaturizing the power source circuit as a whole, and particularly to making it thinner. In accordance with experiments, the thickness of a switching power supply, the output of which is 5v at 100w, can be reduced to approximately ½ as compared with the conventional one.

What is claimed is:

1. A switching power supply comprising:

a housing;

a switching device;

a power transformer having an input side to which said switching device is connected to drive said transformer by means of its switching operation, and an output side which has a hot side terminal and a cold side terminal, said power transformer providing an output between said hot side terminal and said cold side terminal in response to the switching operation of said switching device;

heat generating circuit elements fed currents from said output side of said transformer;

a pair of plate-shaped conductors to which said heat generating circuit elements are connected both electro-conductively and heat-conductively, one of said plate-shaped conductors being connected to said hot side terminal and the other of said plate-shaped conductors being connected to said cold side terminal; and at least two heat conductive insulating plates one of which is inserted beween said plate-shaped conductors and the other of which is inserted between at least one of said plate-shaped conductors and said housing, so as to transmit heat generated by said heat generating circuit elements to said housing to provide heat dissipation;

said power transformer including a core arranged to contact at least one of said plate-shaped conductors.

2. A switching power supply as in claim 1, wherein said heat conductive insulating plates are made of silicone.

* * * * *